(12) United States Patent
Liebhart et al.

(10) Patent No.: US 10,257,038 B2
(45) Date of Patent: Apr. 9, 2019

(54) METHOD AND APPARATUS FOR PERFORMING FLEXIBLE SERVICE CHAINING

(71) Applicants: NOKIA SOLUTIONS AND NETWORKS OY, Espoo (FI); Rainer Liebhart, Munich (DE); Devaki Chandramouli, Plano, TX (US)

(72) Inventors: Rainer Liebhart, Munich (DE); Devaki Chandramouli, Plano, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 179 days.

(21) Appl. No.: 15/106,170

(22) PCT Filed: Dec. 19, 2013

(86) PCT No.: PCT/US2013/076634
§ 371 (c)(1),
(2) Date: Jun. 17, 2016

(87) PCT Pub. No.: WO2015/094296
PCT Pub. Date: Jun. 25, 2015

(65) Prior Publication Data
US 2016/0337189 A1    Nov. 17, 2016

(51) Int. Cl.
*H04L 12/24* (2006.01)
*H04L 12/725* (2013.01)
(Continued)

(52) U.S. Cl.
CPC ...... *H04L 41/0816* (2013.01); *H04L 41/0893* (2013.01); *H04L 45/306* (2013.01);
(Continued)

(58) Field of Classification Search
None
See application file for complete search history.

(56) References Cited

U.S. PATENT DOCUMENTS 9,258,742 B1 *    2/2016    Pianigiani ............. H04L 67/327
2005/0289244 A1  12/2005    Sahu et al.
(Continued)

OTHER PUBLICATIONS

International Search Report and Written Opinion for corresponding International Application No. PCT/US2013/076634, dated May 23, 2014.
(Continued)

*Primary Examiner* — Christine T Duong
(74) *Attorney, Agent, or Firm* — Squire Patton Boggs (US) LLP (57) ABSTRACT

A method and apparatus can be configured to transmit first policy rules to a packet-data-network gateway. The first policy rules are configured to be installed on the packet-data-network gateway. The first policy rules are configured to enable the packet-data-network gateway to create first route-header information. The method can also include transmitting second policy rules to an interworking gateway. The second policy rules are configured to be installed on the interworking gateway. The second policy rules are configured to enable the interworking gateway to create second route-header information.

11 Claims, 9 Drawing Sheets

(51) Int. Cl.
*H04L 12/813* (2013.01)
*H04W 72/04* (2009.01)
*H04L 12/26* (2006.01)
*H04W 88/16* (2009.01)

(52) U.S. Cl.
CPC ......... *H04L 47/20* (2013.01); *H04W 72/0493* (2013.01); *H04L 41/5054* (2013.01); *H04L 43/028* (2013.01); *H04W 88/16* (2013.01)

(56) References Cited

U.S. PATENT DOCUMENTS

| | | |
|---|---|---|
| 2010/0121960 A1 | 5/2010 | Baniel et al. |
| 2011/0286395 A1 | 11/2011 | Liebsch et al. |
| 2012/0017262 A1 | 1/2012 | Kapoor et al. |
| 2012/0082158 A1* | 4/2012 | Reddy ................. H04W 80/045 370/389 |
| 2012/0166618 A1 | 6/2012 | Dahod et al. |
| 2012/0263041 A1 | 10/2012 | Giaretta et al. |
| 2012/0281540 A1* | 11/2012 | Khan ................... H04L 45/308 370/241 |
| 2013/0064082 A1 | 3/2013 | Jin et al. |

OTHER PUBLICATIONS

3GPP / 3GPP TSG-SA WG1 #64, S1-135300, San Francisco, USA, Nov. 11-15, 2013 (revision of S1-135080) (revision of S1-135243), Title: New SID on Study on Flexible Mobile Service Steering.

3GPP / 3GPP TS 23.401 V12.3.0 (Dec. 2013) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 12)/Dec. 17, 2013.

Dunbar L et al Architecture for Chaining Legacy Layer 4-7 Service Functions; draft-dunbar-sfc-legacy-14-17-chain-architecture-00.txt; 2013.

Bitar N. et al Interface to the Routing System (I2RS) for Service Chaining: Use Cases and Requirements; draft-bitar-i2rs-service-chaining-00.txt; 2013.

Boucadair C et al Service Function Chaining: Design Considerations, Analysis & Recommendations; draft-boucadair-sfc-design-analysis-01.txt; 2013.

Cao Z. Routing Update Mechanism for Network Service Chaining; draft-cao-nsc-rtg-update-00; 2013.

European Search Report application No. 13899813.3 dated Jun. 16, 2017.

* cited by examiner

METHOD AND APPARATUS FOR PERFORMING FLEXIBLE SERVICE CHAINING

BACKGROUND

Field

Embodiments of the invention relate to performing flexible service chaining.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method can include transmitting, by a network entity, first policy rules to a packet-data-network gateway. The first policy rules are configured to be installed on the packet-data-network gateway. The first policy rules are configured to enable the packet-data-network gateway to create first route-header information. The method can also include transmitting second policy rules to an interworking gateway. The second policy rules are configured to be installed on the interworking gateway. The second policy rules are configured to enable the interworking gateway to create second route-header information.

In the method of the first embodiment, the first and second route-header information is configured to determine service-chain paths taken by data flows in both uplink and downlink directions.

In the method of the first embodiment, the method further includes receiving a notification regarding an event that triggers a change in policy rules. The transmitting the first policy rules and the transmitting the second policy rules are in response to the received notification.

In the method of the first embodiment, the interworking gateway is configured to determine a service-chain path for a downlink data flow in accordance with the second policy rules. The packet-data-network gateway is configured to determine a service-chain path for an uplink data flow in accordance with the first policy rules.

In the method of the first embodiment, the event that triggers a change in policy rules comprises at least one of a change in subscription information, a change in an availability of service enablers, a change in a condition to invoke a service enabler, a change in radio-access-technology type, and a change in network status.

According to a second embodiment, an apparatus can include at least one processor. The apparatus can also include at least one memory including computer program code. The at least one memory and the computer program code can be configured, with the at least one processor, to cause the apparatus at least to transmit first policy rules to a packet-data-network gateway. The first policy rules are configured to be installed on the packet-data-network gateway. The first policy rules are configured to enable the packet-data-network gateway to create first route-header information. The apparatus can also be caused to transmit second policy rules to an interworking gateway. The second policy rules are configured to be installed on the interworking gateway. The second policy rules are configured to enable the interworking gateway to create second route-header information.

In the apparatus of the second embodiment, the first and second route-header information is configured to determine service-chain paths taken by data flows in both uplink and downlink directions.

In the apparatus of the second embodiment, the apparatus is further caused to receive a notification regarding an event that triggers a change in policy rules. The transmitting the first policy rules and the transmitting the second policy rules are in response to the received notification.

In the apparatus of the second embodiment, the interworking gateway is configured to determine a service-chain path for a downlink data flow in accordance with the second policy rules. The packet-data-network gateway is configured to determine a service-chain path for an uplink data flow in accordance with the first policy rules.

In the apparatus of the second embodiment, the event that triggers a change in policy rules comprises at least one of a change in subscription information, a change in an availability of service enablers, a change in a condition to invoke a service enabler, a change in radio-access-technology type, and a change in network status.

According to a third embodiment, a computer program product can be embodied on a non-transitory computer readable medium. The computer program product can be configured to control a processor to perform a process including transmitting, by a network entity, first policy rules to a packet-data-network gateway. The first policy rules are configured to be installed on the packet-data-network gateway. The first policy rules are configured to enable the packet-data-network gateway to create first route-header information. The process can also include transmitting second policy rules to an interworking gateway. The second policy rules are configured to be installed on the interworking gateway. The second policy rules are configured to enable the interworking gateway to create second route-header information.

According to a fourth embodiment, a method can include receiving, by a network entity, policy rules. The method can also include installing the policy rules. The policy rules are configured to enable the network entity to create route-header information.

In the method of the fourth embodiment, the route-header information is configured to determine a service-chain path taken by a data flow.

In the method of the fourth embodiment, the network entity is configured to determine a service-chain path for a downlink data flow or for an uplink data flow in accordance with the policy rules.

In the method of the fourth embodiment, the network entity corresponds to an interworking gateway or a packet-data-network gateway.

According to a fifth embodiment, an apparatus can include at least one processor. The apparatus can also include at least one memory including computer program code. The at least one memory and the computer program code can be configured, with the at least one processor, to cause the apparatus at least to receive policy rules. The apparatus can be caused to install the policy rules. The policy rules are configured to enable the apparatus to create route-header information.

In the apparatus of the fifth embodiment, the route-header information is configured to determine a service-chain path taken by a data flow.

In the apparatus of the fifth embodiment, the apparatus is configured to determine a service-chain path for a downlink data flow or for an uplink data flow in accordance with the policy rules.

In the apparatus of the fifth embodiment, the apparatus corresponds to an interworking gateway or a packet-data-network gateway.

According to a sixth embodiment, a computer program product can be embodied on a non-transitory computer readable medium. The computer program product configured to control a processor to perform a process including receiving, by a network entity, policy rules. The process can include installing the policy rules. The policy rules are configured to enable the network entity to create route-header information According to a seventh embodiment, an apparatus can include means for transmitting first policy rules to a packet-data-network gateway. The first policy rules are configured to be installed on the packet-data-network gateway. The first policy rules are configured to enable the packet-data-network gateway to create first route-header information. The apparatus can also include means for transmitting second policy rules to an interworking gateway. The second policy rules are configured to be installed on the interworking gateway. The second policy rules are configured to enable the interworking gateway to create second route-header information.

According to an eighth embodiment, an apparatus can include means for receiving policy rules. The method can also include installing the policy rules. The policy rules are configured to enable the apparatus to create route-header information.

BRIEF DESCRIPTION OF THE DRAWINGS

For proper understanding of the invention, reference should be made to the accompanying drawings, wherein.

DETAILED DESCRIPTION

Embodiments of the invention relate to performing flexible service chaining Evolved Packet System (EPS) is generally considered to be a successor technology to General-Packet-Radio System (GPRS). EPS provides a new radio interface and provides new packet-core-network functions for broadband-wireless-data access.

Figure 1:
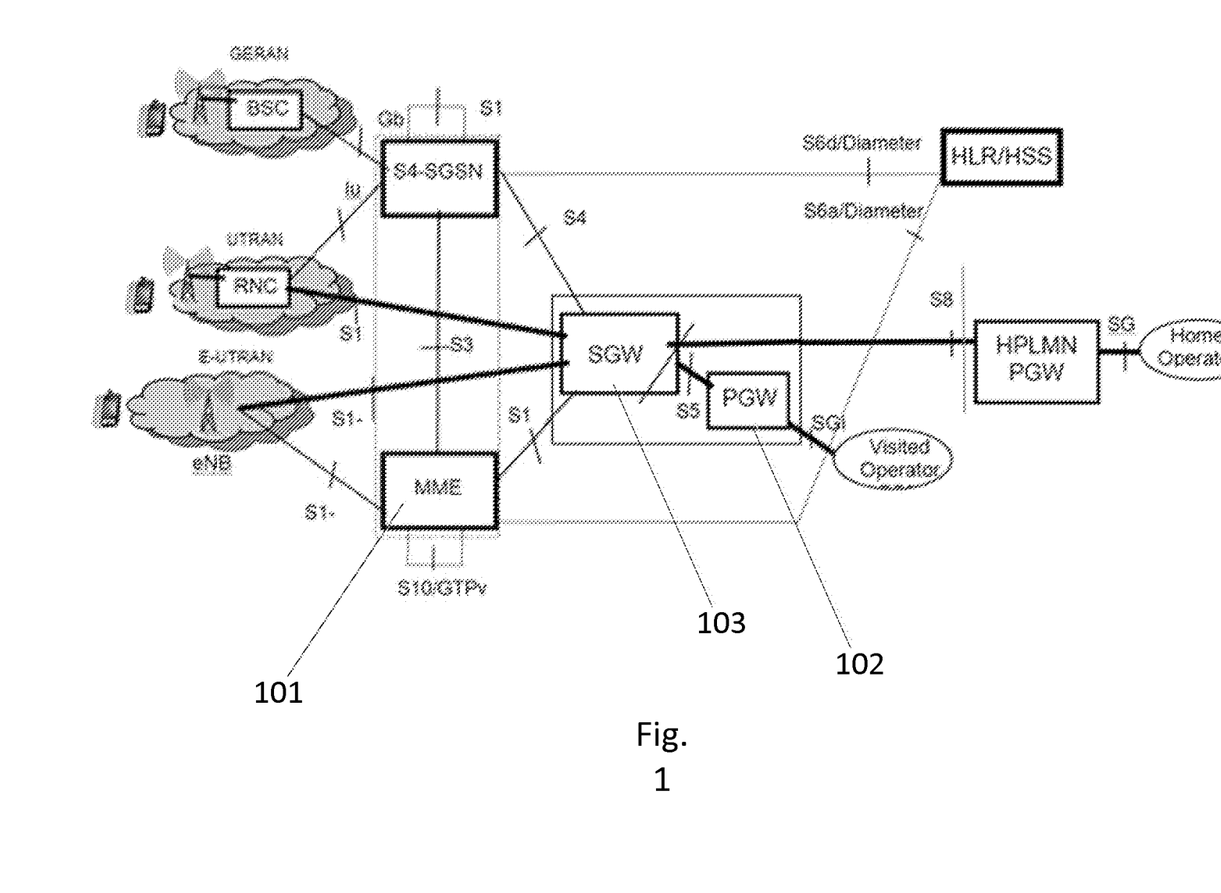
FIG. 1 illustrates a packet-core network.

FIG. 1 illustrates a packet-core network. The functions of the EPS packet-core network are performed by the Mobility Management Entity (MME) 101, the Packet Data Network Gateway (P-GW) 102, and the Serving Gateway (S-GW) 103. A packet-core network can be used in conjunction with Radio Access Networks (RAN), such as GSM EDGE Radio Access Networks (GERAN) and UMTS Terrestrial Radio Access Networks (UTRAN), for example. A packet-core network can generally provide GPRS services.

Recently, mobile network operators have shown more interest in virtualization. Virtualization generally involves the implementation of network functions using software-based solutions. The ETSI Network Functions Virtualization Industry Specification Group (NFV ISG) forum has been formed to help the industry converge upon common approaches to solve the technical challenges relating to Network Function Virtualization (NFV). By converging upon common approaches, the industry can more readily leverage economies of scale. NFV ISG seeks to help the industry to reduce capital expenditures, to reduce operating expenditures, to reduce expenditures of space, and to reduce power consumption. As a next step, mobile network operators are interested in developing software-defined networks that can help create abstract representations of network functions and that can enable faster innovation.

A new 3GPP work item from China Mobile Communication Corporation and Huawei describes methods of performing service chaining Objectives of the work item include (1) the studying of scenarios for mobile-service orchestration and (2) the identifying of requirements/characteristics of mobile-service orchestration. Different aspects of mobile-service orchestration are studied in order to realize an efficient and flexible service-routing mechanism in networks based on a mobile operator's specific policy (depending on offered services and deployment scenarios, deep-packet inspection (DPI) functions and/or content optimizers can be linked into the service chain, for example). For example, it may be desirable to realize an efficient and flexible service-routing mechanism in a (S)Gi-Local-Area-Network ((S)Gi-LAN) (based on the operator's specific policy). (S)Gi-LAN refers to the operator controlled network behind the (S)Gi interface at PGW/GGSN.

The above-described work item proposes further investigation for the following scenarios. Further investigation is proposed to determine how to perform flexible-service-chaining selection in accordance with an operator's policy. The flexible service chaining selection can be performed based on a user's profile (e.g., a bronze, silver, and/or gold user), based on an application type (e.g., streaming and/or peer-to-peer (P2P) services), and/or based on a RAN status (e.g., an amount of cell congestion). Further investigation is proposed to determine how to configure different service chains for one data flow based on differentiated operator rules. Further investigation is proposed to determine how to adapt a user's service chain in response to a change in a Gi-LAN's network topology According to the previous approaches, an operator can deploy a mobile-service valued-added network (such as a Gi LAN network, for example). The mobile-service value-added network can be used by the operator to improve a user's quality-of-experience, to reduce a bandwidth pressure, and to provide a valued-added service, for example. According to the proposal described in the previously-referenced work item, two kinds of service-chain models are generally deployed in a Gi-LAN network.

One kind of service-chain model can be a static-serial model. With this static-serial model, service enablers are statically connected with each other, and network traffic goes through all of the service enablers deployed on the service chain. Access-Point-Names (APN) are generally used to differentiate each service chain.

One other kind of service-chain model can be a hairpin model. With this hairpin model, all service enablers connect to a centralized traffic-routing controller, and the network traffic is transmitted back to the centralized controller in order to determine the next hop for the network traffic after the earlier service enabler has processed the network traffic.

However, both of the above-described service-chain models have certain shortcomings. For example, both of the above-described service-chain models can suffer from technical rigidity and technical complexity. For example, when using the static-serial model, not all service enablers are needed in all cases, and thus always using all the service enablers generally results in the addition of unnecessary transfer delay.

Further, when using the static-serial model, all of the service enablers on the chain generally have to be configured to process the maximum amount of traffic that is capable of being transmitted, even though only certain service enablers are typically needed to process the network traffic.

Thus, the static-serial model is generally associated with high operating expenditures. With the high operating expenditures, it may be difficult to adjust a service chain if a service enabler of the service chain is reused in multiple service chains. Difficulties may arise when changing a shared enabler because such a change may impact a number of configuration jobs.

With the hairpin model, there are also generally high-capital expenditures. With the hairpin model, network traffic generally goes through a centralized controller to determine the next hop. Configuring the traffic to go through the centralized controller generally negatively affects certain complex functionalities, e.g., deep-packet inspection (DPI) capability.

The Open Network Foundation (ONF) provides programmable service routing mechanisms using an open-flow protocol. The Service-Function-Chaining (SFC) and Open-Network-Foundation-defined (ONF-defined) routing mechanisms can be used by a mobile operator as a service-routing mechanism in a Gi-LAN network. However, it is not clear how the mobile operator should leverage the newly-defined service-routing mechanism to accomplish Gi LAN traffic steering. It is not clear how to improve the functions of the entities defined in 3GPP to work in conjunction with the service-routing mechanisms that are discussed by Internet Engineering Task Force (IETF) or by ONF.

According to the previous approaches, on the uplink, Policy-and-Charging-Rules-Function (PCRF) can install policies in the Policy-and-Charging-Enforcement-Function (PCEF), which is part of the Packet Data Network Gateway (P-GW), regarding service chaining, and PCEF can update headers of internet-protocol (IP) packets (of the network traffic) to include the route for a service-chain path in the uplink (UL). Updating headers may not be possible for the downlink (DL) because the source for the DL packets may not be trusted to follow the necessary policy rules, and the packet may not traverse the service chain as intended by the mobile operator for a given flow.

In view of the difficulties described above, certain new mechanisms are proposed by embodiments of the present invention. In contrast to the internet-protocol (IP) routing mechanisms of the previous approaches, embodiments of the present invention bring a new "on demand" routing mechanism, which can be used for realizing an efficient and flexible routing mechanism.

Figure 2:
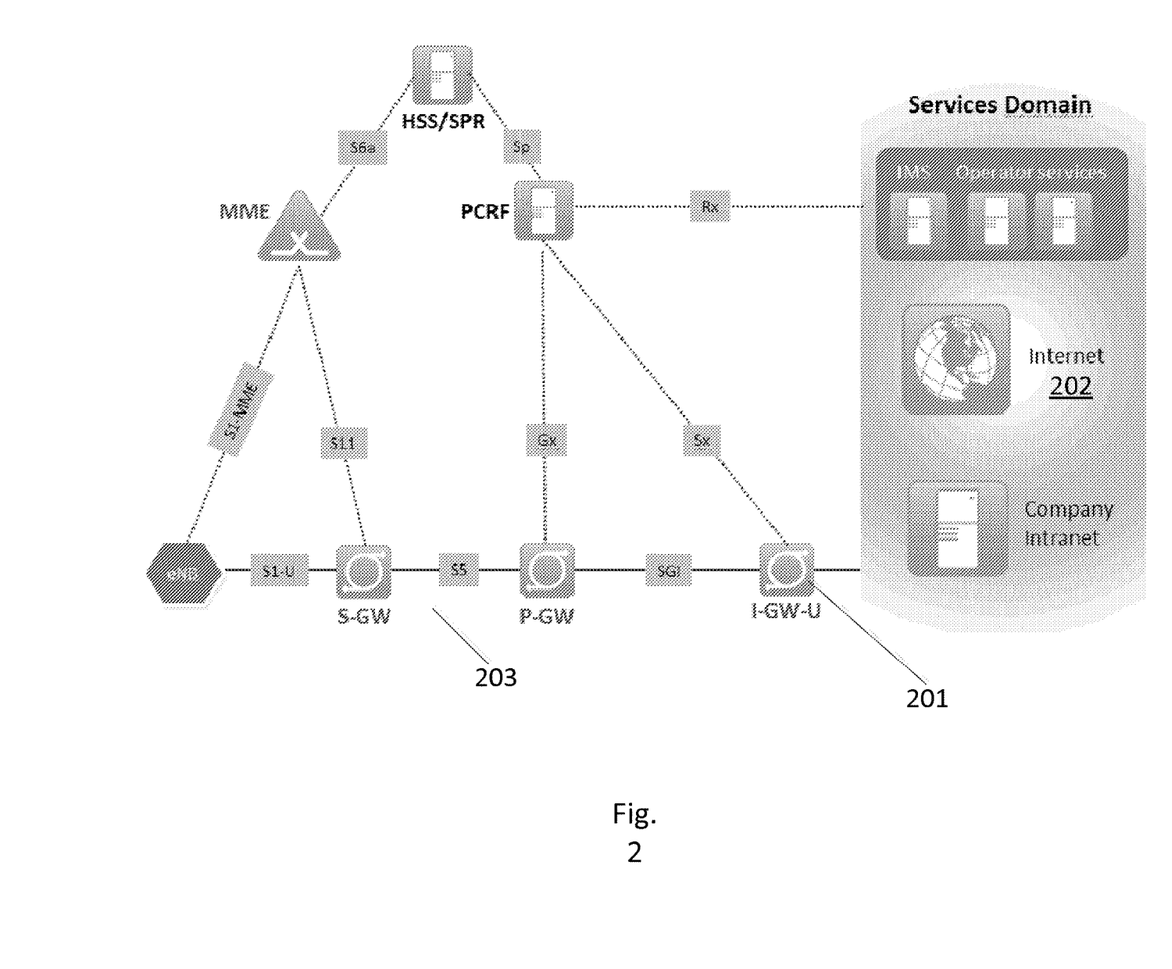
FIG. 2 illustrates a network in accordance with embodiments of the present invention.

FIG. 2 illustrates a network in accordance with embodiments of the present invention. Embodiments of the present invention introduce an "entry point" I-GW-U 201 to the mobile operators' network 203. The entry point can ensure that the network packets coming into and going out from the operator's network from/to external sources (such as from the Internet 202) contain appropriate policy information. Once the network packets contain appropriate policy information, the network packets can have the appropriate route headers installed so that the network packets can traverse the appropriate service chain. One main function of the entry point is to ensure that the incoming network traffic traverses the appropriate service chain on the DL to reach the P-GW. As shown in FIG. 2, the entry point can be a light-weight gateway (GW) (for example, I-GW-U 201) introduced within the 3GPP architecture to be placed at the edge of the mobile network 203.

Figure 3:
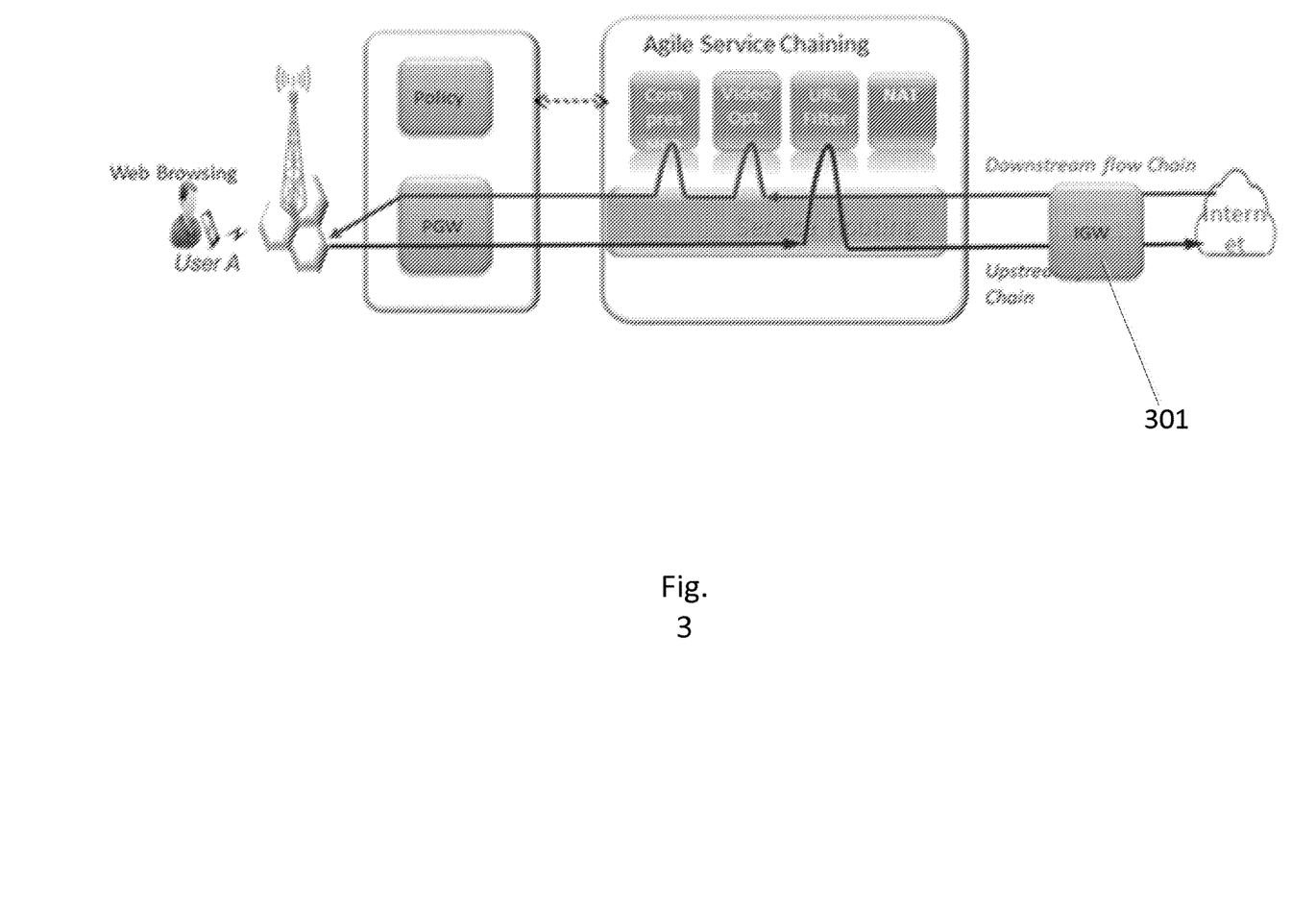
FIG. 3 illustrates service chaining in accordance with embodiments of the present invention.

FIG. 3 illustrates service chaining in accordance with embodiments of the present invention. In embodiments of the present invention, a light-weight gateway (such as I-GW 301) can help to overcome the above-described shortcomings of the previous approaches. The I-GW 301 can generally enable flexible service chaining in the DL as well as in the UL. Enabling such flexible service chaining can increase the overall flexibility in the service-chaining architecture. For example, with the more-flexible service-chaining architecture, both DL and UL traffic can take the same service-chain path. Alternatively, with the more-flexible service-chaining architecture, DL and UL traffic can also take different service-chain paths, as illustrated by FIG. 3. With the more-flexible service-chaining architecture, all service data flows for a certain user equipment (UE) can take a same service-chain path. Alternatively, with the more-flexible service-chaining architecture, each service data flow for the certain UE can take a different service-chain path.

Figure 4:
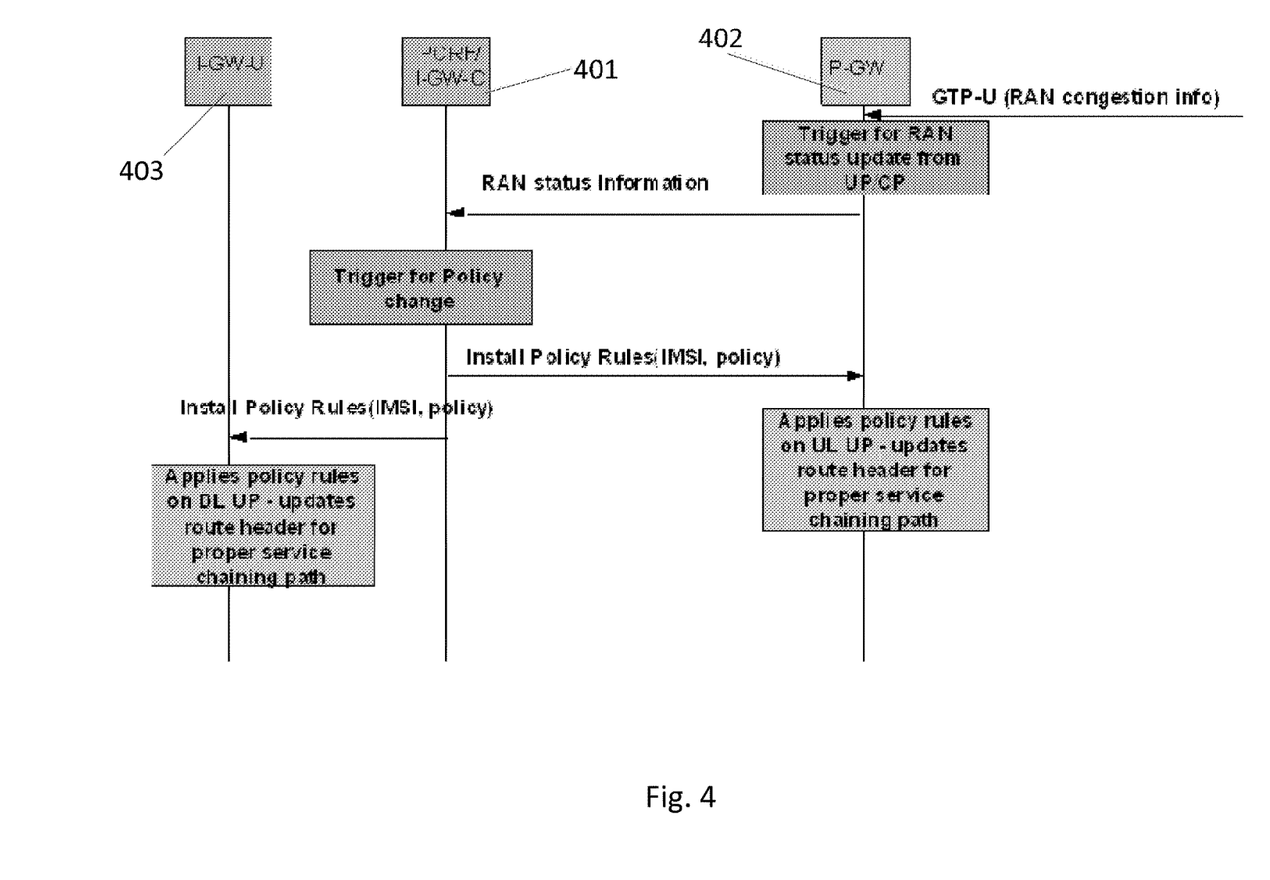
FIG. 4 illustrates a procedure for implementing service chaining in accordance with embodiments of the present invention.

FIG. 4 illustrates a procedure for implementing service chaining in accordance with embodiments of the present invention. In embodiments of the present invention, PCRF and/or an I-GW-C (or another entity that controls the service chain) transmits policy rules to be installed on P-GW 402 via interface Gx. The policy rules can be installed based on subscription information, based on operator policies, and/or based on any other information for UL flows. For example, a user who has a voice-over-LTE (VoLTE) subscription may be required to go through a session-border controller (SBC) in the service-chaining path when the user is trying to make a VoLTE call. As another example, traffic of users who have subscribed to certain services like voice-over-IP (VoIP) will not traverse DPI, while other traffic will do so. Similarly, the PCRF/I-GW-C 401 can transmit policy rules for directing service chaining to be installed on I-GW-U 403 via new interface Sx. The policy rules can be installed based on subscription, based on operator policies, and/or based on any other information for DL flows. Based on the policy rules, the P-GW 402 and the I-GW-U 403 can create route-header information for user-plane data packets of network data traffic. The route-header information can then determine the service-chain path taken by the data flow in the service chain. P-GW 402 can determine the service-chain path taken by the data flow for the UL path, and I-GW-U 403 can determine the service-chain path taken by the data flow for the DL path. Each service-chain path can be determined in accordance with the policy rules. As described above, I-GW-U can be a light-weight user-plane function that acts as an "entry point" for network traffic. I-GW-C can be a control plane function that can perform policy control for a service-chaining path and that can control the I-GW-U.

I-GW-C and I-GW-U can be collocated or separated. PCRF is one example of an I-GW-C function.

The above-described policy rules installed on P-GW 402 and on I-GW 403 can, for example, determine route-header information which indicates the next possible hops (the next progressions) in the service path for the data flow. Route-header information can indicate source/destination IP addresses for the network traffic to traverse from/to, can indicate source/destination port numbers for the network traffic to traverse from/to, and can indicate protocols for the network traffic to use. The presence of route-header information can occur once per group of user plane packets (of the network traffic). For example, in one embodiment, the route-header information can be included with the network traffic per each 5-tuple group of the user plane packets (of the network traffic).

The policy rules can be dynamically changed by the PCRF/I-GW-C 401 at any point in time. The policy rules can be dynamically changed, for example, when a subscription information, availability of service enablers, a condition to invoke a certain service enabler, a RAT type, a RAN status, and/or a type of service changes. The following describes some possible events which can trigger a policy change for a service chaining path. In other words, the PCRF/I-GW-C 401 can receive notification regarding an event that triggers a change in policy rules. The policy rules can then be changed in response to the event that triggers the change.

Service enablers can announce themselves to the PCRF/I-GW-C 401. Service enablers can also inform the PCRF/I-GW-C 401 about changed conditions, whether or not to invoke the service enablers into the data path, and when to invoke them into the data path.

Changed subscription information can be pushed to the PCRF/I-GW-C 401 via an existing interface Sp, or the information can be pushed to the I-GW-C alone via a new interface from a home-subscriber-server/subscriber-profile-repository (HSS/SPR). The interface Sp can be considered to be an interface between a subscription-profile registry and the PCRF/I-GW-C 401.

A change in Radio-Access Technology (RAT) type (e.g., from E-UTRAN to UTRAN) or a change in RAN status (such as an updated amount of RAN congestion data) can be delivered to PCRF/I-GW-C 401 via interface Gx or via a new interface specified by 3GPP. The RAT type or the RAN status can also be delivered to I-GW-C via interface Sx from I-GW-U 403 or via a new interface specified by 3GPP.

A service-chain path can be optimized depending on a type of application. PCRF/I-GW-C 401 can install the service-chain path based on the application type within P-GW 402 and I-GW 403. For example, a video stream application can provide an enhanced quality-of-experience (QoE) if a video-optimization enabler is inserted. The type of application can be detected by using deep-packet inspection (DPI) within P-GW 402, I-GW-U 403, or as part of the service chain itself. For example, DPI can be inserted in the service-chain path and can trigger policy changes at PCRF/I-GW-C 401. The DPI can dynamically adjust the route-header information.

One main benefit of embodiments of the present invention is that all the use-cases, as required by the above-described 3GPP work item, can be enabled. In one use case, a service enabler can be selected based on a user profile. In another use case, the selection of the service enabler is affected by the service type. In another use case, the selection of the service enabler is affected by a RAT type or RAN status (RAN status can be delivered by RAN to P-GW and further on to PCRF, or via Operation-and-Maintenance (OAM) to PCRF). In another use case, different chains are used for traffic in the downlink and uplink.

Figure 5:
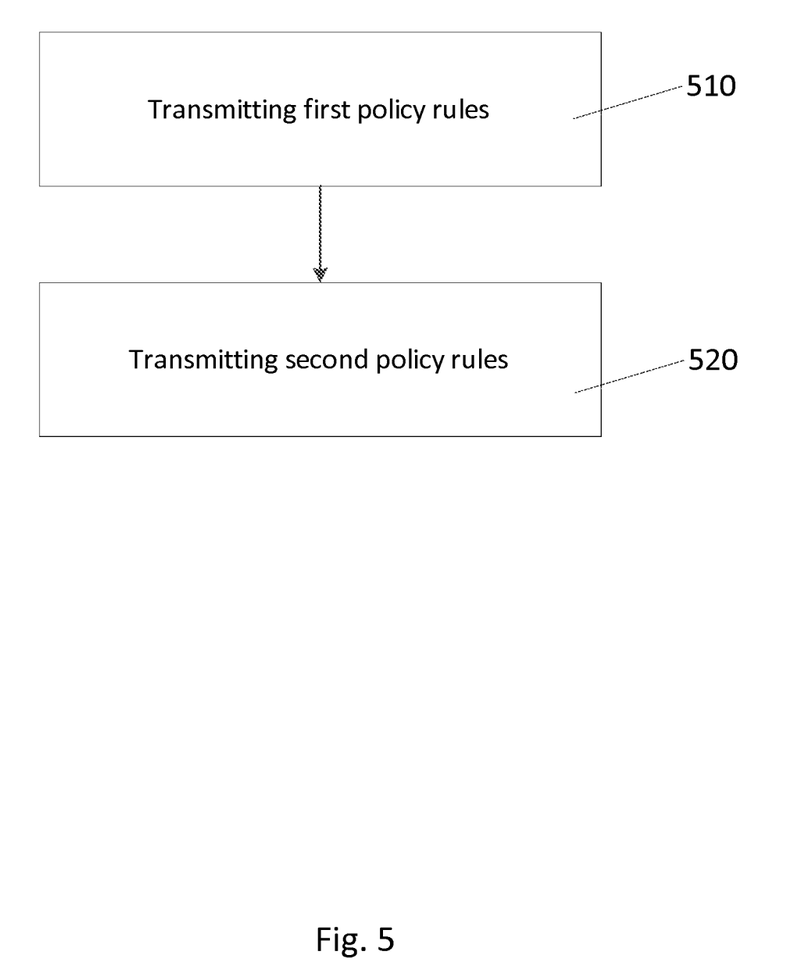
FIG. 5 illustrates a flowchart of a method in accordance with embodiments of the invention.

FIG. 5 illustrates a flowchart of a method in accordance with embodiments of the invention. The method illustrated in FIG. 5 includes, at 510, transmitting, by a network entity, first policy rules to a packet-data-network gateway. The first policy rules are configured to be installed on the packet-data-network gateway. The first policy rules are configured to enable the packet-data-network gateway to create first route-header information. The method also includes, at 520, transmitting second policy rules to an interworking gateway. The second policy rules are configured to be installed on the interworking gateway. The second policy rules are configured to enable the interworking gateway to create second route-header information.

Figure 6:
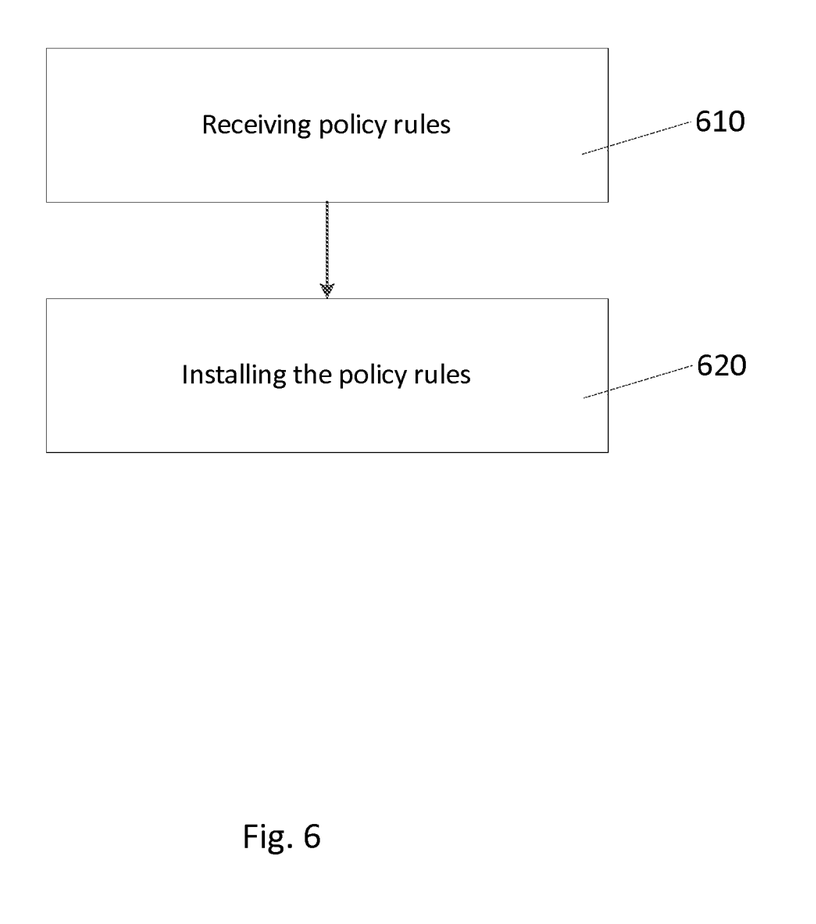
FIG. 6 illustrates a flowchart of a method in accordance with embodiments of the invention.

FIG. 6 illustrates a flowchart of a method in accordance with embodiments of the invention. The method illustrated in FIG. 6 includes, at 610, receiving, by a network entity, policy rules. The method also includes, at 620, installing the policy rules. The policy rules are configured to enable the network entity to create route-header information for proper setup of a service-chaining path.

Figure 7:
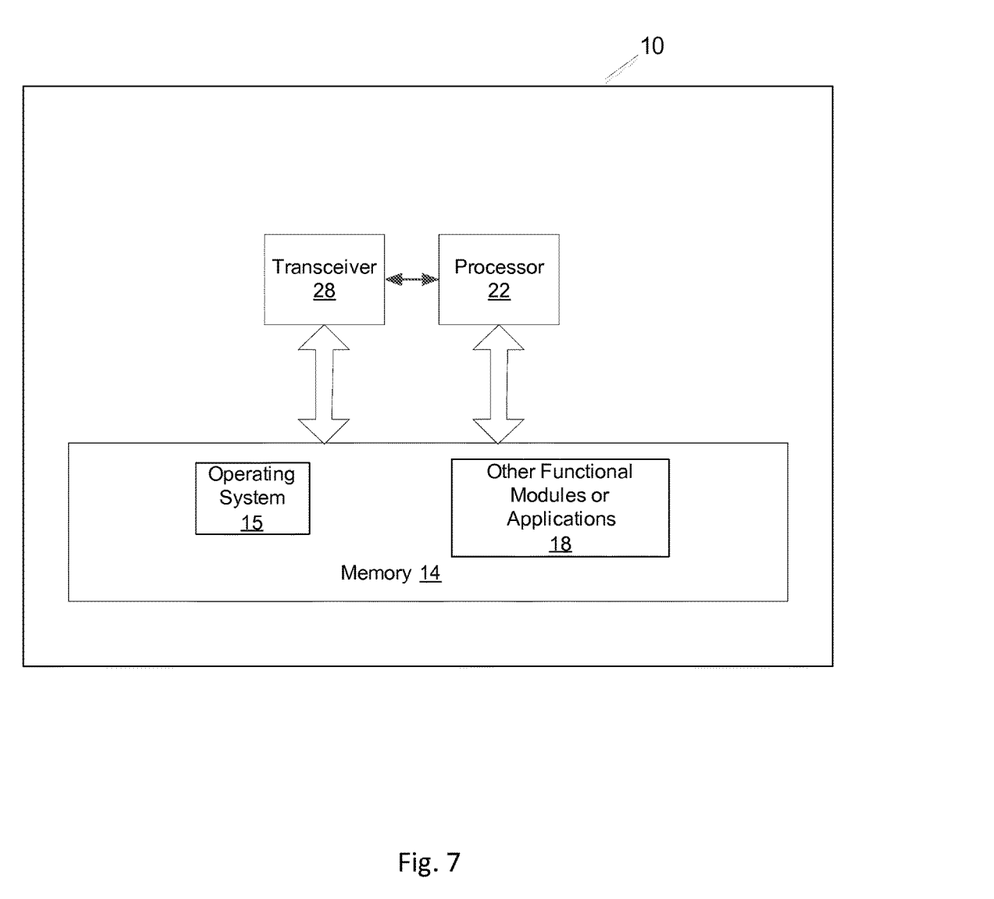
FIG. 7 illustrates an apparatus in accordance with embodiments of the invention.

FIG. 7 illustrates an apparatus in accordance with embodiments of the invention. In one embodiment, the apparatus can be a network entity such as a PCRF. In one embodiment, the apparatus can be an interworking gateway. In another embodiment, the apparatus can be a packet data network gateway. In another embodiment, the apparatus can be a serving gateway. Apparatus 10 can include a processor 22 for processing information and executing instructions or operations. Processor 22 can be any type of general or specific purpose processor. While a single processor 22 is shown in FIG. 7, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 8:
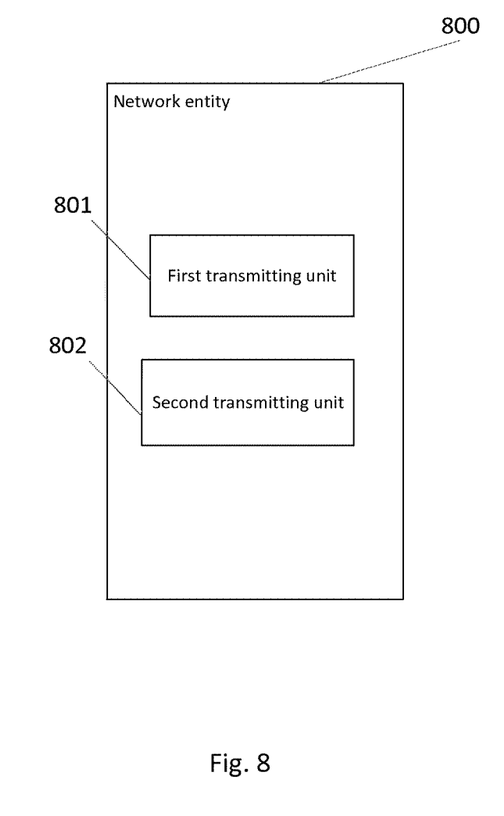
FIG. 8 illustrates an apparatus in accordance with embodiments of the invention.

FIG. 8 illustrates an apparatus in accordance with embodiments of the invention. Apparatus 800 can be a network entity such as a PCRF, for example. Apparatus 800 can include a first transmitting unit 801 that transmits first policy rules to a packet-data-network gateway. The first policy rules are configured to be installed on the packet-data-network gateway. The first policy rules are configured to enable the packet-data-network gateway to create first route-header information. Apparatus 800 can also include a second transmitting unit 802 that transmits second policy rules to an interworking gateway. The second policy rules are configured to be installed on the interworking gateway. The second policy rules are configured to enable the interworking gateway to create second route-header information.

Figure 9:
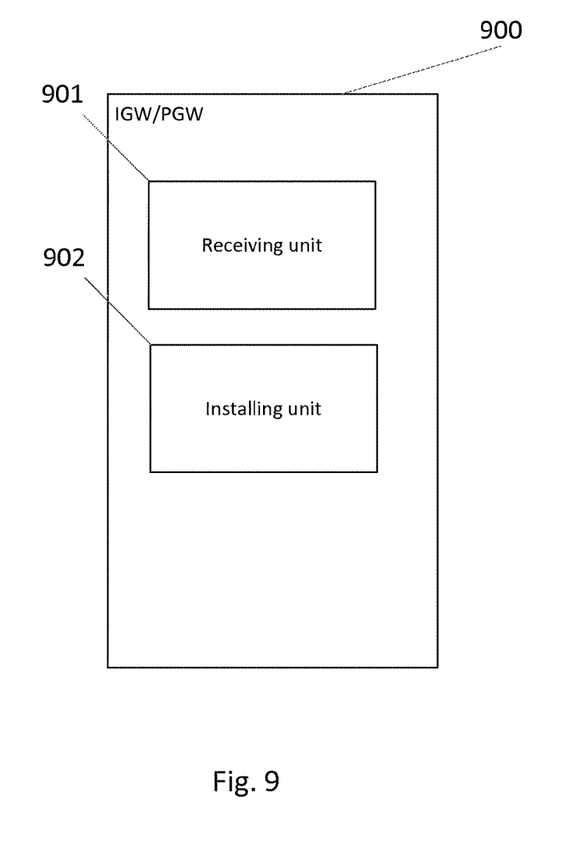
FIG. 9 illustrates an apparatus in accordance with embodiments of the invention.

FIG. 9 illustrates an apparatus in accordance with embodiments of the invention. Apparatus 900 can be a I-GW or a P-GW, for example. Apparatus 900 can include a receiving unit 901 that receives policy rules. Apparatus 900 can also include an installing unit 902 that installs the policy rules. The policy rules are configured to enable the apparatus to create route-header information.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
transmitting, by a network entity, first policy rules to a packet-data-network gateway, wherein the first policy rules are configured to be installed on the packet-data-network gateway, and the first policy rules are configured to enable the packet-data-network gateway to create first route-header information; and
transmitting second policy rules to an interworking gateway, wherein the second policy rules are configured to be installed on the interworking gateway, and the second policy rules are configured to enable the interworking gateway to create second route-header information, wherein the packet-data-network gateway and the interworking gateway are distinct entities.

2. The method according to claim 1, wherein the first and second route-header information is configured to determine service-chain paths taken by data flows in both uplink and downlink directions.

3. The method according to claim 1, further comprising receiving a notification regarding an event that triggers a change in policy rules, wherein the transmitting the first policy rules and the transmitting the second policy rules are in response to the received notification.

4. The method according to claim 1, wherein the interworking gateway is configured to determine a service-chain path for a downlink data flow in accordance with the second policy rules, and the packet-data-network gateway is configured to determine a service-chain path for an uplink data flow in accordance with the first policy rules.

5. The method according to claim 3, wherein the event that triggers a change in policy rules comprises at least one of a change in subscription information, a change in an availability of service enablers, a change in a condition to invoke a service enabler, a change in radio-access-technology type, and a change in network status.

6. An apparatus, comprising:
at least one processor; and
at least one memory including computer program code, the at least one memory and the computer program code configured, with the at least one processor, to cause the apparatus at least to
transmit first policy rules to a packet-data-network gateway, wherein the first policy rules are configured to be installed on the packet-data-network gateway, and the first policy rules are configured to enable the packet-data-network gateway to create first route-header information; and
transmit second policy rules to an interworking gateway, wherein the second policy rules are configured to be installed on the interworking gateway, and the second policy rules are configured to enable the interworking gateway to create second route-header information,
wherein the packet-data-network gateway and the interworking gateway are distinct entities.

7. The apparatus according to claim 6, wherein the first and second route-header information is configured to determine service-chain paths taken by data flows in both uplink and downlink directions.

8. The apparatus according to claim 6, wherein the apparatus is further caused to:
receive a notification regarding an event that triggers a change in policy rules, wherein the transmitting the first policy rules and the transmitting the second policy rules are in response to the received notification.

9. The apparatus according to claim 6, wherein the interworking gateway is configured to determine a service-chain path for a downlink data flow in accordance with the second policy rules, and the packet-data-network gateway is configured to determine a service-chain path for an uplink data flow in accordance with the first policy rules.

10. The apparatus according to claim 8, wherein the event that triggers a change in policy rules comprises at least one of a change in subscription information, a change in an availability of service enablers, a change in a condition to invoke a service enabler, a change in radio-access-technology type, and a change in network status.

11. A computer program product, embodied on a non-transitory computer readable medium, the computer program product configured to control a processor to perform a process, comprising:
- transmitting, by a network entity, first policy rules to a packet-data-network gateway, wherein the first policy rules are configured to be installed on the packet-data-network gateway, and the first policy rules are configured to enable the packet-data-network gateway to create first route-header information; and
- transmitting second policy rules to an interworking gateway, wherein the second policy rules are configured to be installed on the interworking gateway, and the second policy rules are configured to enable the interworking gateway to create second route-header information,
- wherein the packet-data-network gateway and the interworking gateway are distinct entities.

* * * * *